United States Patent [19]

Loe, Jr.

[11] 4,221,632
[45] Sep. 9, 1980

[54] METHOD AND APPARATUS FOR DETERMINING THE LOCATION OF THE CHIP LEVEL IN A PULPING DIGESTER

[75] Inventor: Alton L. Loe, Jr., Tacoma, Wash.

[73] Assignee: Weyerhaeuser Company, Tacoma, Wash.

[21] Appl. No.: 26,534

[22] Filed: Apr. 3, 1979

Related U.S. Application Data

[63] Continuation of Ser. No. 735,437, Oct. 26, 1976, abandoned.

[51] Int. Cl.² .................. D21C 7/10; D21C 7/12; D21C 7/14
[52] U.S. Cl. .................. 162/49; 73/295; 162/238; 162/250; 222/54; 422/62; 422/105; 422/235
[58] Field of Search ............ 162/49, 52, 61, 237, 162/238, 250, DIG. 10, 263; 73/295; 222/54, 56, 64, 66; 214/17 CA; 23/253 A, 230 A; 422/105, 62, 235

[56] References Cited

U.S. PATENT DOCUMENTS

| 1,814,027 | 7/1931 | Dunbar | 162/61 |
|---|---|---|---|
| 2,246,563 | 6/1941 | Winters | 73/295 |
| 2,359,714 | 10/1944 | McKay | 162/61 |
| 2,468,676 | 4/1949 | Liben | 73/295 |
| 2,680,298 | 6/1954 | Obenshain | 162/49 |
| 2,938,639 | 5/1960 | Boyd | 214/17 CA |
| 3,045,869 | 7/1962 | Rodth et al. | 222/54 |
| 3,085,624 | 4/1963 | Hurstman | 162/238 |
| 3,111,031 | 11/1963 | Kuritza | 73/295 |
| 3,485,100 | 12/1969 | Petersen | 73/295 |
| 3,500,687 | 3/1970 | Smith | 73/295 |
| 3,811,994 | 5/1974 | Ostberg | 162/237 |

FOREIGN PATENT DOCUMENTS

| 823900 | 9/1969 | Canada . | |
| 2361627 | 6/1974 | Fed. Rep. of Germany | 162/237 |
| 2439077 | 3/1975 | Fed. Rep. of Germany | 162/19 |

OTHER PUBLICATIONS

Morrison; Paper Trade Journal, Sep. 14, 1964, pp. 47-51.
Lambert et al., "Chip Level in a Digester is Controlled with a Two Position Torque Switch," *Pulp and Paper*, 1970, p. 98.
Moore; "Application of Radio isotopes in Paper Mills," Wood, Paper, Pulp Inds. Conf. 1964, pp. 125-129.
"Digester Problem Statement"; Hubbe, pp. 61A-69A, *Tappi;* vol. 49, No. 5 (May 1966).

*Primary Examiner*—S. Leon Bashore
*Assistant Examiner*—Steve Alvo
*Attorney, Agent, or Firm*—Christensen, O'Connor, Johnson & Kindness

[57] ABSTRACT

A pulping digester contains a liquid digesting medium and wood chips dispersed in the medium. The level of the wood chips in the digester is normally below the top of the digester. As chips and digesting medium are fed to the digester and as pulp and digesting medium are withdrawn from the digester, the chip level will vary dependent upon the net addition of chips and withdrawal of pulp. The variable location of the chip level, or chip height, is determined by positioning a temperature sensing means in the upper portion of the digester above the normally desired chip level. The temperature sensed by the sensing means is displayed to and monitored by the digester operator. As the chip level rises toward the temperature sensor, the sensed temperature will fall until the chip level rises above the location of the temperature sensor, after which the sensed temperature will rapidly increase as the chip level continues to rise above the location of the sensing means. The inverse relationship is true as the chip level falls, providing a characteristic curve of temperature versus chip level from which the chip height can be determined.

8 Claims, 3 Drawing Figures

U.S. Patent  Sep. 9, 1980  4,221,632
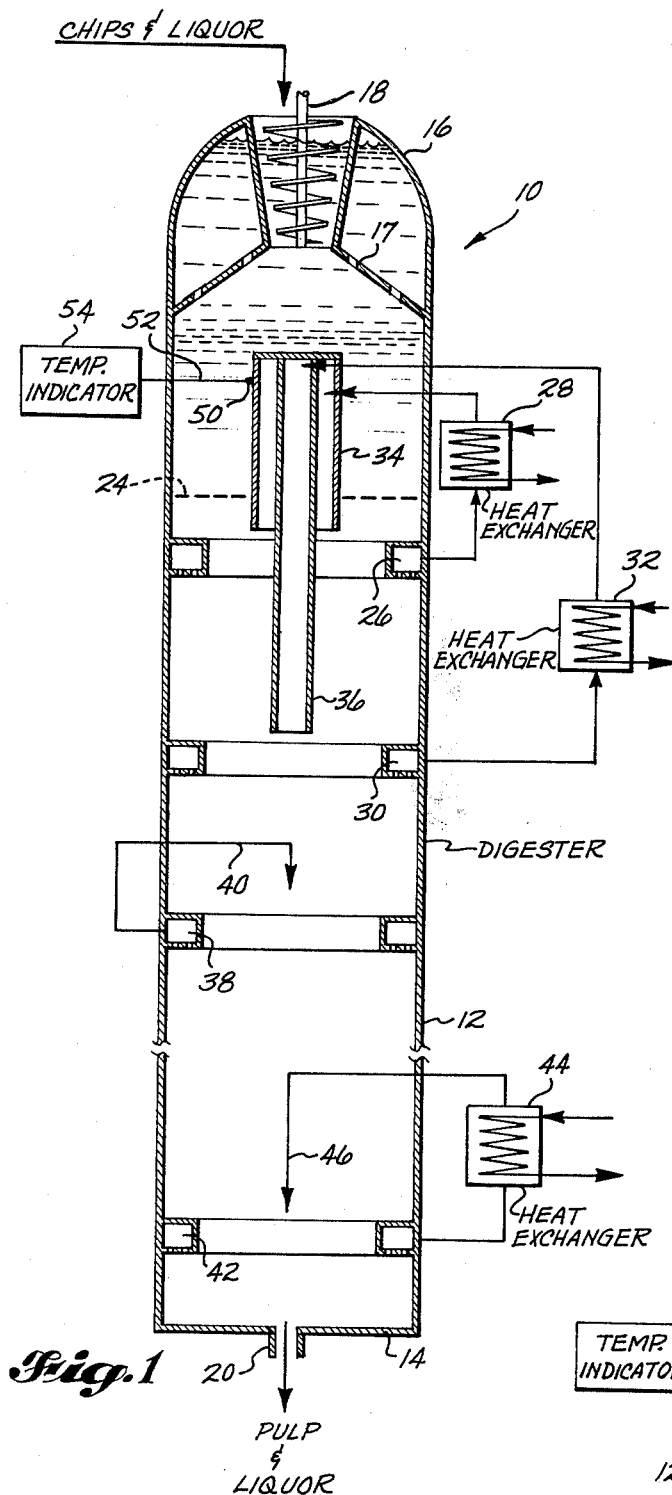
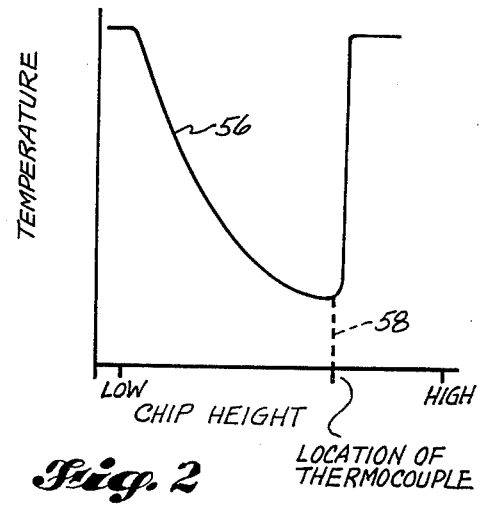
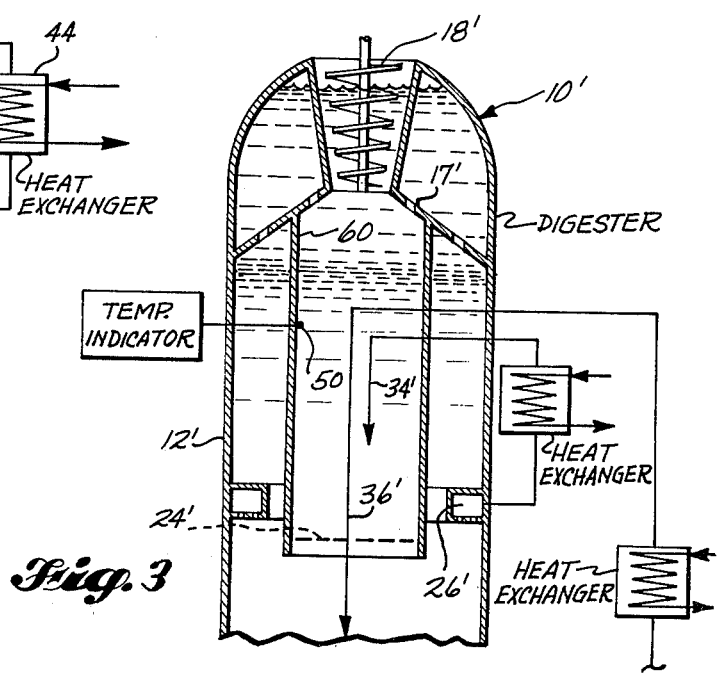

METHOD AND APPARATUS FOR DETERMINING THE LOCATION OF THE CHIP LEVEL IN A PULPING DIGESTER

This is a continuation of application Ser. No. 735,437 filed Oct. 26, 1976 now abandoned.

BACKGROUND OF THE INVENTION

The present invention relates to pulping digesters (or reactors) for delignifying wood chips to produce wood pulp, and more particularly, to an apparatus and method for determining the height of the mass of chips dispersed in a digesting medium present in the digester.

Conventional pulping digesters are cylindrical vessels, having a height on the order of two hundred feet and a diameter on the order of sixteen feet. A digesting medium, normally referred to as "liquor," and wood chips are introduced into the top of the digester while liquor and wood pulp are withdrawn from the bottom. As the chips travel through the digester from top to bottom, the lignin in the chips is chemically broken down to free the cellulosic material in the chips and to form a pulp suitable for paper making and other uses. The digester is normally maintained in a condition in which it is full of liquor. As chips are continuously fed into the digester from the top, the chips tend to settle in the liquor, leaving a region at the top of the digester containing substantially chip-free liquor. Thus, under normal operating conditions, the level of chips in the digester is below the top of the digester, while the digester is full of liquor.

The throughput of a pulping digester, although sometimes automatically controlled with the aid of a computer, is often manually controlled by an operator. The operator controls the chip level by increasing or reducing the rate at which chips and liquor are introduced into the digester and by increasing or reducing the rate at which pulp and liquor are withdrawn from the digester. When more chips and liquor are added to the digester than pulp and liquor withdrawn, the chip level will rise, and vice versa. If the operator has no accurate or convenient means for determining the location of the chip level, i.e., the chip height, in the digester, the chip level can easily deviate from desired or optimum operating range.

In order to adjust and control the chip level, the operator must have some means for determining the chip height at any given time. The use of sight holes or other visual devices are impractical since pulping digesters are pressure vessels and are normally operated at pressures on the order of 165 psig. Several different devices have been used in an attempt to provide the operator at least with a relative indication of when the chip level goes above or recedes below a preferred operating height. One such device is a torque tube driven by an electric motor that is inserted into the top portion of the digester. The torque tube carries two radial paddles that are situated at a position in the digester that is somewhat above the desired operating height for the chip level. A device for measuring the angular displacement of the paddles relative to a given location on the torque tube is associated with the paddles and tube. When the paddles are rotating in the liquor alone, little or no angular displacement of the paddles occurs. However, when the chip level rises above the location of the paddles, a substantial increase in the angular displacement of the paddles is effected. When the angular displacement exceeds a predetermined amount, the chip level presumably has risen above the location of the rotating paddles. When the operator makes the appropriate adjustment to lower the chip level, he can readjust the digester throughput to a steady state condition once the angular displacement of the paddles drops to its normal level, since presumably at that time the paddles are again rotating only in the liquor. Although this device is sometimes effective to provide an indication whether or not the chip level is above or below a given height in the digester, the device cannot provide a relative measurement of chip height. Moreover, this device is necessarily mechanical in nature and is subject to high maintenance and to down time during which the operator of the digester has no convenient means of monitoring the chip level. In addition, this device tends to be unreliable, as new chips entering the digester pass through the paddles and cause transient increases in the angular displacement of the paddles that is not necessarily indicative of a change in the chip height.

To solve the problems associated with prior art devices such as those described above, a broad object of the present invention is to provide a means for determining chip level in a pulping digester than can provide a direct indication of the chip height as opposed to a relative indication of whether the chip level is above or below a given location in the digester. Further objects of the present invention are to provide a means for so doing that provides a signal that is easily converted to information readily understandable by a digester operator; to provide such a means that has no moving parts positioned in the digester, and has, therefore, a greater reliability and is easier to maintain and install than prior art devices; and to provide such a means that will yield repeatable results and will so function over extended periods of digester operation.

SUMMARY OF THE INVENTION

In accordance with the foregoing objects, and other objects that will become apparent to one of ordinary skill after reading the following specification, the present invention provides both a method and apparatus for determining the location of the chip level, i.e., the chip height, in a pulping digester. In this environment, the improved method for determining the chip height in the digester comprises (a) sensing the temperature of the digesting medium at a predetermined position in the digester and (b) displaying the sensed temperature to provide an indication of the location of the chip level relative to the predetermined position. The predetermined position at which the temperature is sensed is located in the digester so that when the chip level is below the predetermined position, the sensed temperature will fall as the chip level moves toward the predetermined position and so that when the chip level is above the predetermined position, the sensed temperature will rise.

The apparatus for determining the location of the chip level in a pulping digester includes a temperature sensing means and an indicating means responsive to the temperature sensing means. The temperature sensing means senses the temperature of the digesting medium at a predetermined position in the digester adjacent and preferably above the normal operating location of the chip level. The predetermined position is located so that when the chip level is below the predetermined position, the temperature falls as the chip level moves towards the position and, when the chip level is above the predetermined position, the sensed temperature rises. The indicating means provides an output signal corresponding to the sensed temperature, which in turn is representative of the location of the variable chip level in the digester.

BRIEF DESCRIPTION OF THE DRAWINGS

A better understanding of the present invention can be derived by reading the ensuing specification in conjunction with the accompanying drawings wherein:

FIG. 1 is a simplified schematic of a pulping digester for delignifying wood chips incorporating the present invention;

FIG. 2 is a graph of indicated temperature versus chip height in the digester; and FIG. 3 is a view of the upper portion of a second pulping digester incorporating a second embodiment of the present invention.

DETAILED DESCRIPTION

The pulping digester schematically illustrated in FIG. 1 is a much simplified depiction of a pulping digester manufactured by Kamyr Corporation of Glens Falls, N.Y. This digester is of the continuous operation type and can be utilized with several of the currently used commercial pulping processes including the sulfite process, the Kraft process, and the soda-oxygen process. The digester, generally designated 10, is a relatively tall pressure vessel having a cylindrically shaped outer wall 12, a bottom 14 and a hemispherically shaped top portion 16. A frustoconically shaped baffle 17 is positioned in the top of the digester and extends downwardly and outwardly from a feed screw or auger 18 positioned centrally in the top of the digester. Chips and liquor (digesting medium) are fed into an opening in the top of the digester and are forced into the interior of the digester by screw 18. One of ordinary skill in the art will understand that the fittings and piping associated with the top and bottom of the vessel are sealed so that the interior of the pulping digester can be maintained at relatively high pressures, normally on the order of 165 psig. As the pulp and liquor are withdrawn through a conduit 20, the chips fed to the top of the reactor will travel downwardly and be progressively delignified as they reach the bottom of the reactor. The pulp and liquor withdrawn from the bottom of the digester through the outlet conduit 20 are normally discharged into a blow tank (not shown) in which the pulp is separated from the liquor. The liquor is then subjected to intermediate processing and recycled into the top of the digester.

Under normal operating conditions, an adequate amount of chips and makeup liquor are added to the top of the digester to compensate for the pulp and liquor withdrawn from the bottom. The liquor is normally supplied to the digester in an amount sufficient to maintain the level of the liquor at the top of the digester. The amount of chips fed to the digester is normally sufficient to maintain the chip level, indicated by dashed line 24, at a relatively constant location in the digester. To maintain optimum conversion efficiency, that is, to maximize impregnation of the chips with liquor, it is desirable to maintain the chip level 24 at some location near the top of the digester but at or perferably slightly below the bottom of the feed screw 18.

At four locations in the digester, a portion of the liquor is separated from the combined mass of liquor and chips and reintroduced into the digester at a location above that at which it was withdrawn. For example, a first portion of the liquor is withdrawn through an annular separator 26 positioned adjacent the outside wall of the digester, circulated through an upper heater or heat exchanger 28 located outside the digester and reintroduced into the digester. At a location below the upper separator 26, additional liquor is withdrawn through a second separator 30, passed through a lower heater or heat exchanger 32, and reintroduced into the digester. The liquor that passes through both the upper heater 28 and the lower heater 32 is reintroduced into a pair of concentric pipes 34 and 36. The outer pipe 34 terminates above the upper separator 26 while the inner pipe 36 terminates above the lower separator 30 and below the lower terminus of the outer pipe 34. Th heated liquor from the upper heater 28 is introduced into the annular channel between the outer and inner pipes while the liquor from the lower heater 32 is introduced into the inner pipe 36. Additional liquor is withdrawn in an extraction zone 38 and recirculated as a quench flow via pipe 40 into the central portion of the digester at an elevation below the lower separator 30 but above the extraction zone 38. An additional separator 42 is positioned adjacent the bottom of the digester. Additional liquor is withdrawn through the lower separator 42, passes through a wash heater or heat exchanger 44 and is reintroduced via pipe 46 as a wash flow above the lower separator 42. For purposes of simplicity both pipes 40 and 46 are shown as entering the digester slightly above the extraction zone 38 and the separator 42. In an actual Kamyr digester, these pipes are constructed and mounted concentrically within inner pipe 36 and extend downwardly through the digester with their outlets respectively above the extraction zone 38 and separator 42.

In accordance with the present invention, a thermocouple 50, or other suitable temperature sensing means, is positioned within the digester adjacent the outer surface of the outer pipe 34 through which the liquor from the upper heater is reintroduced into the digester. Preferably, the thermocouple 50 is placed in close proximity to but not in intimate thermal contact with the outer surface of the outer pipe 34. This location allows the thermocouple to sense the liquor temperature immediately adjacent the outside of the outer pipe 34, but not to sense the temperature of the pipe itself. The thermocouple is vertically positioned adjacent the outer pipe 34 at a location below the level of the liquor (since the digester is full of liquor) and also preferably above the desired operating height for the chip level 24. The thermocouple 50 is connected by a signal transmitting lead 52 of conventional construction to a temperature indicator 54. The temperature indicator 54 can be any of a variety of conventional devices available commercially for visually displaying a temperature or otherwise indicating a value corresponding to the sensed temperature. The indicator is placed at the digester operator's station and can be used to visually indicate the temperature sensed at the location of the thermocouple 50.

Referring to FIG. 2, a characteristic temperature profile 56 is produced by plotting the temperature sensed by the thermocouple 50 against the chip height. The temperature profile 56 is somewhat parabolically shaped, with the location of the thermocouple indicated by the dotted vertical line 58. The portion of the profile 56 to the left of the thermocouple location line 58 is the corresponding temperature profile for a chip level as it varies below the thermocouple location. The portion of the profile 56 to the right of the thermocouple location line 58 illustrates the corresponding temperature profile for a chip level as it varies above the thermocouple location.

When the chip level is below the thermocouple location and rises, that is, advances toward the thermocouple location, the indicated temperature will drop, reaching its lowest point when the chip level is even with the thermocouple location. As the chip level rises above the thermocouple location, the sensed temperature rises rapidly. Vice versa, when the chip level is above the thermocouple and is lowered to below the thermocouple location, the temperature rapidly drops, again reaching its lowest point when the chip level is slightly below the thermocouple location. As the chip level drops away from the thermocouple, the sensed temperature again begins to rise as indicated.

Thus by observing temperature changes over time, that is, by taking a temperature reading, adjusting the chip level in the digester and by then taking another temperature reading, the operator of the digester can ascertain not only whether the chip level is above or below the location of the thermocouple but can also determine the chip height, that is, a measurement of the location of chip level in the column relative to the thermocouple location. It is preferable for the operator to maintain the chip level in the region adjacent the left hand side of the thermocouple location line 58 on the graph of FIG. 2. That is, it is preferable to maintain a chip height slightly below the location of the thermocouple in the digester since a more accurate determination of chip height can be derived from the sensed temperature because of the relatively gradual change of temperature with a change in chip height on the left hand side of the thermocouple location line 58 on the graph. Once the chip level rises above the location of the thermocouple, the sensed temperature rises very rapidly and then levels off at a temperature near that of the outer pipe 34 independently of a variation in the chip level. The optimum vertical location in the digester for the thermocouple 50 will vary in practice depending upon the construction of the particular digester with which the invention is to be associated. Normally, however, the thermocouple will be located below the bottom of the feed screw 18.

The characteristic temperature profile illustrated in FIG. 2 is made possible by the unique heat balance existing in the upper portion of the pulping digester. Briefly summarizing the heat balance, heat is being transferred to the liquor in the region adjacent the location of the thermocouple 50 from the heated liquor passing through the concentric pipes 34 and 36. In addition, heat is being lost outwardly from the liquor adjacent the thermocouple through the outer wall 12 of the digester. Additional heat is being transferred into the liquor adjacent the thermocouple from the chip-liquor mixture below the chip level 24. As the chip level rises toward the thermocouple from below, the chips serve as an insulating layer having an increasing vertical depth, reducing the heat transfer from the chip liquor mixture to the region adjacent the thermocouple 50. Thus as the chip level rises toward the thermocouple, more heat is lost than is added to the region adjacent the thermocouple, causing a lowering in the temperature of the liquor surrounding the thermocouple. As the chip level reaches and exceeds the location of the thermocouple, the chips in the mixture still tend to form an insulator but at this height prevent heat loss from the liquor and chips surrounding the thermocouple. Thus there is a net heat addition to the liquor surrounding the thermocouple causing a concomitant temperature rise. Although the sensed temperature is affected by variations in the input flow of liquor and chips to the digester, this variation is small under normal operating conditions and will not significantly affect the results of the present invention.

The present invention takes advantage of this heat balance condition by monitoring the temperature of the liquor, displaying that temperature, and providing an operator with operating history of the digester via a graph similar to that in FIG. 2. Thus by observing the changes in temperature and knowing whether or not there has been a net addition or subtraction of chips from the reactor, the operator can very closely determine the chip height in the digester and thus not have to rely on prior art level indicating devices, which only provided an indication of whether the chip level was above or below a given location in the digester.

Referring now to FIG. 3, a second embodiment of the invention is depicted. In this embodiment, the digester structure is somewhat different. The concentric pipes are indicated by the flow lines 34' and 36'. The altered digester 10' contains an annular shell 60 that extends downwardly from the frustoconically shaped baffle 17' through a location normally below the average chip height in the digester. The shell 60 is concentrically mounted about the concentric pipes 34' and 36' and is spaced radially outwardly from these pipes and radially inwardly from the outer wall 12' of the digester. The chips are fed from the top of the digester via the screw 18' into the interior of the annular shell 60. The chips travel by gravity downwardly through and exit from the bottom of the annular shell 60, which is located normally below the upper separator 26'. The chip level 24' to be controlled is contained within the shell while the region surrounding the shell 60, the annular cavity between the shell 60 and the outer wall 12' of the digester, is relatively free of chips but contains liquor. The liquor level 22' is maintained at approximately the same location as in the previous embodiment.

In this embodiment the thermocouple 50' is positioned adjacent the interior wall of the shell 60 and is spaced from the outer concentric pipe 34'. Preferably, the thermocouple is placed in close proximity to the inner surface of the wall of the shell 60 so that is senses the liquor temperature adjacent the shell. The vertical positioning of the thermocouple in this embodiment of the invention is determined by the same considerations as in the previous embodiment, that is, it is normally located above the desired operating chip level 24' and below the feed screw 18'. The same characteristic temperature profile dependent upon chip level as that shown in FIG. 2 is derived in this embodiment although the placement of the thermocouple is slightly different.

By reviewing the heat balance in this embodiment, it can be seen that there is a net heat input to the liquor from the heated liquor passing through the concentric pipes 34' and 36'. There is also a net heat input into the liquor inside the shell 60 from the liquor surrounding the shell 60. In addition there is a heat input by conduction from the mixture of chips and liquor below the chip level. Again, as the chip level rises toward the thermocouple location from the bottom, there is a net reduction in heat input to the liquor surrounding the thermocouple, resulting in a temperature drop. When the chip level reaches and exceeds the location of the thermocouple, there will be a net heat addition to the liquor surrounding the thermocouple location, thus causing a temperature rise quite similar to that illustrated in FIG. 2 for the first embodiment. The remaining considerations and operating parameters for the second embodiment of the invention are the same as those for the first embodiment. Thus the operator can determine the chip level within the shell 60 by observing the changes in temperature over time with known net addition to or withdrawal of chips from the digester.

After reading the foregoing specification, one of ordinary skill will be able to effect various alterations, substitutions of equivalents and other changes without departing from the broad concept disclosed. For example, a plurality of thermocouples can be positioned in the digester at spaced vertical locations. Each thermocouple and its associated indicator would provide a relative indication of chip height. By comparing indicated temperatures from each of the plurality of sensing locations, an operator would be able to determine the exact chip height relative to each of the sensing locations. It is therefore intended that the scope of protection granted by Letters Patent hereon be limited only by the definition contained in the appended claims and equivalents thereof.

What is claimed is:

1. In an apparatus for delignifying wood chips to form wood pulp, said apparatus containing during operation a digesting medium and wood chips, the chip level in said apparatus being variable and being below the level of said digesting medium, said apparatus including inner and outer, concentrically arranged, digesting medium recirculation pipes positioned in said apparatus, said pipes having outlets at spaced heights in said apparatus, said outer pipe having its outlet located below the location of said chip level and above the outlet of the inner pipe, and first and second means respectively associated with said inner and outer pipes, said first and second means each comprising means for withdrawing digesting medium from below the respective outlets of said pipes, means for heating said digesting medium and means for returning said digesting medium to respective ones of said recirculation pipes, an improvement for determining the location of said chip level relative to a predetermined position in said apparatus, comprising:

a single temperature sensing means located in the apparatus in close proximity to but not in intimate thermal contact with said outer pipe for sensing the temperature of said digesting medium at said predetermined position in said apparatus, said predetermined position being such that when said chip level is below said predetermined position, said sensed temperature falls as said chip level moves toward said predetermined position, and when said chip level is above said predetermined position, said sensed temperature rises, and indicating means responsive to said temperature sensing means for providing an output signal representative of the location of said chip level relative to said predetermined position.

2. In an apparatus for delignifying wood chips to form wood pulp, said apparatus containing during operation a digesting medium and wood chips, the chip level in said apparatus being variable and being below the level of said digesting medium, said apparatus including inner and outer, concentrically arranged, digesting medium recirculation pipes positioned in said apparatus, said pipes having outlets at spaced heights in said apparatus, said outer pipe having its outlet located below and adjacent the location of said chip level and above the outlet of said inner pipe, and first and second means respectively associated with said inner and outer pipes, said first and second means each comprising means for withdrawing digesting medium from below the respective outlets of the pipes, means for heating said digesting medium and means for returning said digesting medium to said respective recirculation pipes, and an annular shell positioned substantially concentrically about said pipes and extending from adjacent the inlet of said apparatus downwardly past at least one of said outlets in said pipes, said shell being spaced inwardly from the outer wall of said apparatus and being spaced outwardly from said pipes, an improvement for determining the location of said chip level relative to a predetermined position in said apparatus, comprising:

a single temperature sensing means located in the apparatus in close proximity to said shell for sensing the temperature of said digesting medium at said predetermined position in said apparatus, said predetermined position being such that when said chip level is below said predetermined position, said sensed temperature falls as said chip level moves toward said predetermined position, and when said chip level is above said predetermined position, said sensed temperature rises, and indicating means responsive to said temperature sensing means for providing an output signal representative of the location of said chip level relative to said predetermined position.

3. In a method for delignifying wood chips including the steps of feeding said chips into a digesting zone, said digesting zone containing a liquid digesting medium, the level of said chips in said digesting zone being lower than the level of said medium, removing a portion of the medium from said digesting zone, heating said medium and recirculating said medium into said digesting zone through inner and outer pipes each having an outlet in the upper portion of said digesting zone below the level of said chips, said chips and said medium in said digesting zone thereby being heated to produce pulp from said chips, and withdrawing pulp from said digesting zone, an improved method for determining the level of said chips in said digesting zone relative to a predetermined position in said digesting zone, comprising the steps of:

sensing the temperature of the medium at a single predetermined position in said digesting zone, said predetermined position being in close proximity to the exterior portion of said outer pipe and not in intimate thermal contact with said outer pipe, said position being such that (a) when said chip level is below said position, said sensed temperature falls as said chip level moves toward said position, and (b) when said chip level is above said position, said sensed temperature rises, and displaying said sensed temperature to provide an indication of the location of said chip level relative to said predetermined position.

4. In a method for delignifying wood chips including the steps of feeding said chips into a digesting zone, said digesting zone containing a liquid digesting medium, the level of said chips in said digesting zone being lower than the level of said medium, removing a portion of the medium from said digesting zone, heating said medium and recirculating said medium into said digesting zone, said chips and said medium in said digesting zone thereby being heated to produce pulp from said chips, said digesting zone having a shell in the upper portion thereof surrounding and spaced outwardly from the location at which said medium is recirculated into said digesting zone, and withdrawing pulp from said digesting zone, an improved method for determining the level of said chips in said digesting zone relative to a predetermined position in said digesting zone, comprising the steps of:

sensing the temperature of the medium at a single predetermined position in said digesting zone, said predetermined position being in close proximity to said shell, said position being such that (a) when said chip level is below said position, said sensed temperature falls as said chip level moves toward said position, and (b) when said chip level is above said position, said sensed temperature rises, and displaying said sensed temperature to provide an indication of the location of said chip level relative to said predetermined location.

5. In an apparatus for delignifying wood chips to form wood pulp, said apparatus containing during operation a digesting medium and wood chips, the chip level in said apparatus being variable and being below the level of said digesting medium, said apparatus including inner and outer, concentrically arranged, digesting medium recirculating pipes positioned in said apparatus, said pipes having outlets at spaced heights in said apparatus, said outer pipe having its outlet located below the location of said chip level and above the outlet of the inner pipe, and first and second means respectively associated with said inner and outer pipes, said first and second means each comprising means for withdrawing digesting medium from below the respective outlets of said pipes, means for heating said digesting medium and means for returning said digesting medium to respective ones of said recirculation pipes, an improvement for determining the location of said chip level relative to a predetermined position in said apparatus, comprising temperature sensing means located in the apparatus in close proximity to but not in intimate thermal contact with said outer pipe for sensing the temperature of said digesting medium at said predetermined position in said apparatus, said predetermined position being such that when said chip level is below said predetermined position, said sensed temperature falls as said chip level moves toward said predetermined position, and when said chip level is above said predetermined position, said sensed temperature rises, and indicating means responsive to said temperature sensing means for providing an output signal representative of the location of said chip level relative to said predetermined position.

6. In an apparatus for delignifying wood chips to form wood pulp, said apparatus containing during operation a digesting medium and wood chips, the chip level in said apparatus being variable and being below the level of said digesting medium, said apparatus including inner and outer, concentrically arranged, digesting medium recirculation pipes positioned in said apparatus, said pipes having outlets at spaced heights in said apparatus, said outer pipe having its outlet located below and adjacent the location of said chip level and above the outlet of said inner pipe, and first and second means respectively associated with said inner and outer pipes, said first and second means each comprising means for withdrawing digesting medium from below the respective outlets of the pipes, means for heating said digesting medium and means for returning said digesting medium to said respective recirculation pipes, and an annular shell positioned substantially concentrically about said pipes and extending from adjacent the inlet of said apparatus downwardly past at least one of said outlets in said pipes, said shell being spaced inwardly from the outer wall of said apparatus and being spaced outwardly from said pipes, an improvement for determining the location of said chip level relative to a predetermined position in said apparatus, comprising:

temperature sensing means located in the apparatus in close proximity to said shell for sensing the temperature of said digesting medium at said predetermined position in said apparatus, said predetermined position being such that when said chip level is below said predetermined position, said sensed temperature falls as said chip level moves toward said predetermined position, and when said chip level is above said predetermined position, said sensed temperature rises, and indicating means responsive to said temperature sensing means for providing an output signal representative of the location of said chip level relative to said predetermined position.

7. In a method for delignifying wood chips including the steps of feeding said chips into a digesting zone, said digesting zone containing a liquid digesting medium, the level of said chips in said digesting zone being lower than the level of said medium, removing a portion of the medium from said digesting zone, heating said medium and recirculating said medium into said digesting zone through inner and outer pipes each having an outlet in the upper portion of said digesting zone below the level of said chips, said chips and said medium in said digesting zone thereby being heated to produce pulp from said chips, and withdrawing pulp from said digesting zone, an improved method for determining the level of said chips in said digesting zone relative to a predetermined position in said digesting zone, comprising the steps of:

sensing the temperature of the medium at a predetermined position in said digesting zone, said predetermined position being in close proximity to the exterior portion of said outer pipe and not in intimate thermal contact with said outer pipe, said position being such that (a) when said chip level is below said position, said sensed temperature falls as said chip level moves toward said position, and (b) when said chip level is above said position, said sensed temperature rises, and displaying said sensed temperature to provide an indication of the location of said chip level relative to said predetermined position.

8. In a method for delignifying wood chips including the steps of feeding said chips into a digesting zone, said digesting zone containing a liquid digesting medium, the level of said chips in said digesting zone being lower than the level of said medium, removing a portion of the medium from said digesting zone, heating said medium and recirculating said medium into said digesting zone, said chips and said medium in said digesting zone thereby being heated to produce pulp from said chips, said digesting zone having a shell in the upper portion thereof surrounding and spaced outwardly from the location at which said medium is recirculated into said digesting zone, and withdrawing pulp from said digesting zone, an improved method for determining the level of said chips in said digesting zone relative to a predetermined position in said digesting zone, comprising the steps of:

sensing the temperature of the medium at a predetermined position in said digesting zone, said predetermined position being in close proximity to said shell, said position being such that (a) when said chip level is below said position, said sensed temperature falls as said chip level moves toward said position, and (b) when said chip level is above said position, said sensed temperature rises, and displaying said sensed temperature to provide an indication of the location of said chip level relative to said predetermined location.

* * * * *